3,042,856
NUCLEAR MAGNETIC RESONANCE DETECTORS
Edward Watson, Hayes, England, assignor, by mesne assignments, to Fairey Aviation Limited, Hayes, England, a company of Great Britain
Filed Oct. 20, 1958, Ser. No. 768,305
Claims priority, application Great Britain Oct. 21, 1957
10 Claims. (Cl. 324—.5)

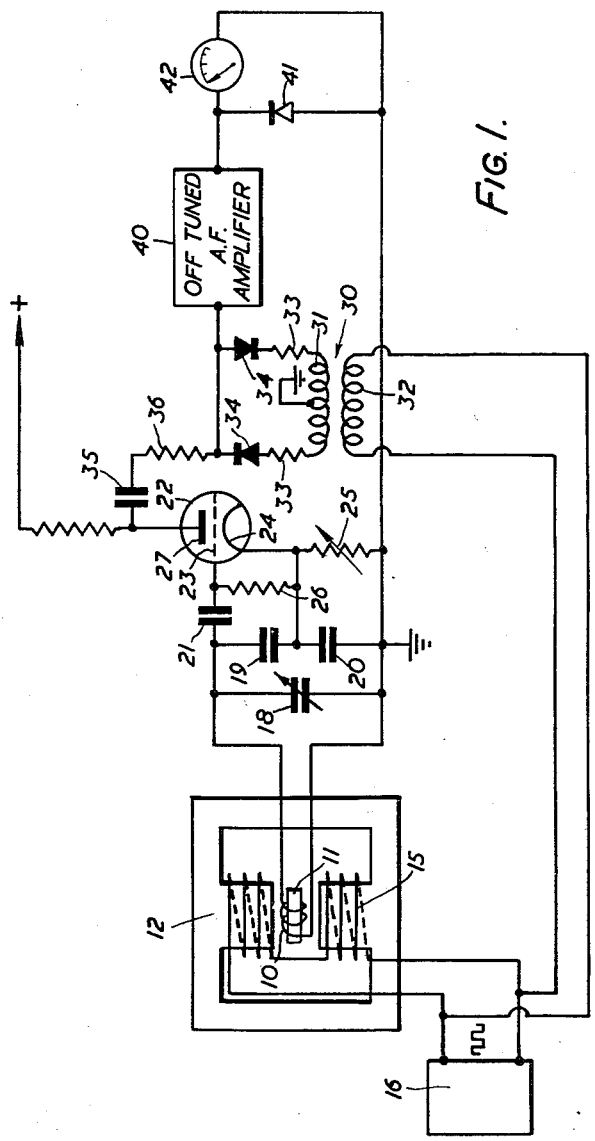

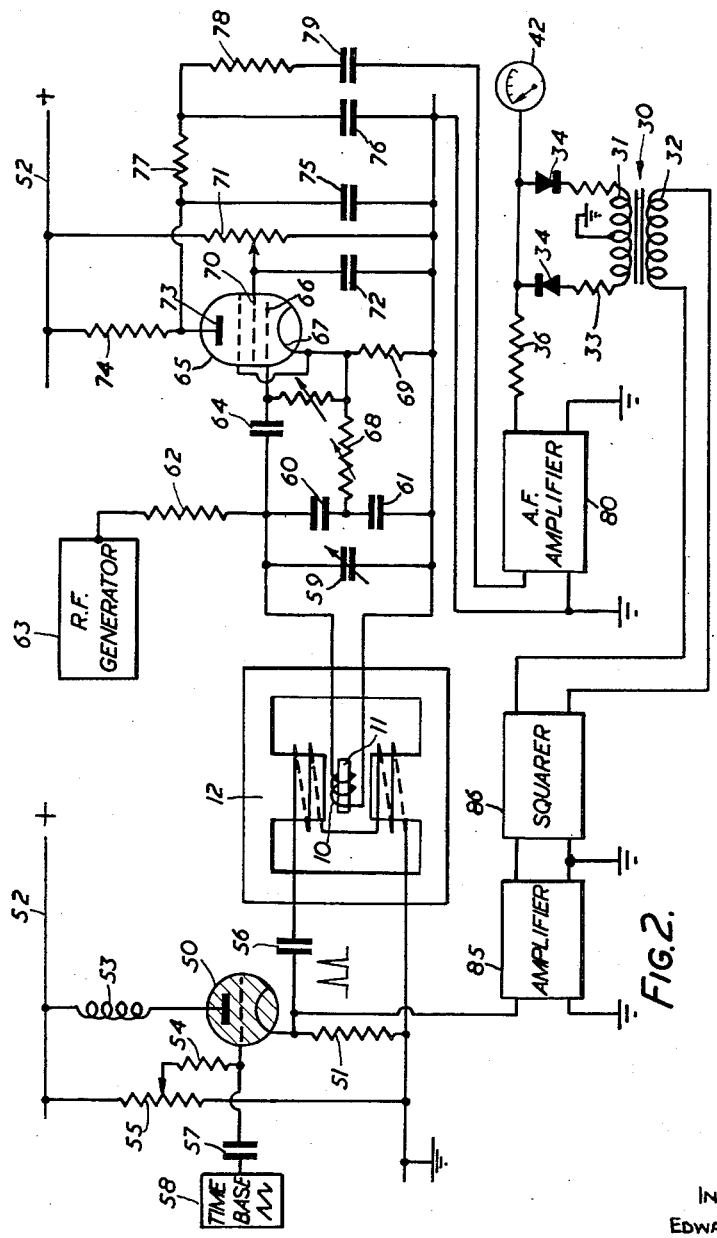

This invention relates to nuclear magnetic resonance detectors.

It is known that since the nucleus of an atom possesses a magnetic field and an angular momentum, the nuclei of a sample of a material placed in an external magnetic field will undergo precessional rotation and the speed of such rotation is generally within the radio-frequency range, i.e. between a hundred thousand revolutions per second and fifty million revolutions per second. Whilst a study of the quantum theory is required to determine the precise behaviour of such nuclei, it is broadly true to say that they behave in the manner of a tuned circuit. In particular if a sample of material is placed in a coil in a transverse magnetic field and an alternating current is passed through the coil at the particular frequency corresponding to a particular material the nuclei will be brought into resonance with it. Moreover the resonance may be detected by the fact that the sample absorbs energy from the coil.

For example the tuned circuit may form part of a self-biasing oscillator which is just oscillating. Then when resonance occurs the specimen absorbs energy from the tuned circuit and the oscillator, in order to maintain oscillation, automatically adjusts its bias to a more positive value, and the resulting change of anode current and potential affords an indication of the resonant condition.

According to the present invention a nuclear magnetic resonance detector includes a test coil to receive the specimen in a transverse magnetic field having a field strength to produce a predetermined resonant frequency, means for producing a high frequency signal in a circuit which includes the test coil and is tuned to a predetermined frequency differing from the resonant frequency by an amount approximately in the audio range, means for periodically altering the resonant frequency and/or the tuned frequency and rapidly restoring it so as to pass rapidly through a resonance condition, and frequency-responsive means responsive to the frequency of a beat signal component of the potential across the tuned circuit corresponding to the difference between the said predetermined frequencies.

The tuned circuit may be part of a self-biasing oscillator serving to produce the high-frequency signal. Alternatively the high-frequency signal may be derived from a separate generator whereof the frequency may be crystal-controlled. Conveniently the frequency-responsive means include a tuned audio-frequency amplifier of one or more stages, which may be tuned to a frequency just outside the range of beat frequencies, so that its output amplitude varies with the beat frequency.

In one arrangement the nuclear resonance frequency is varied in relation to that of the high-frequency signal in accordance with a square wave, and means is provided for suppressing the audio-frequency beat signal during alternate half cycles of the square wave. In an alternative arrangement the nuclear resonance frequency is varied in relation to that of the high-frequency signal in accordance with a series of short pulses, conveniently supplied by a thyratron converter. In this case the pulse repetition frequency may be modulated at a scanning frequency through a range including the beat frequency or a multiple or sub-multiple thereof, whereby the amplitude of the beat signal is dependent on its frequency, and means responsive to its amplitude is also responsive to its frequency.

The invention may be carried into practice in various ways but one specific embodiment will be described by way of example with reference to the accompanying drawings in which:

FIGURE 1 is a circuit diagram of one arrangement, and
FIGURE 2 is a circuit diagram of another arrangement.

In the embodiment shown in FIGURE 1 the apparatus includes a small test coil 10 designed to receive a sample 11 to be analysed, within a transverse magnetic field of a very high degree of uniformity provided by a powerful permanent magnet assembly 12. The establishment of the magnetic field forms no part of the present invention.

The magnetic field in which the specimen lies is provided with exciting coils 15 by which the field strength can be slightly increased or reduced and these are connected to a generator 16 for supplying a square wave excitation to such coils. The amplitude of this excitation is such as to vary the resonance frequency of the nuclei of the sample through a convenient range of a few thousand cycles per second, so that it is alternately kept constant at two slightly different predetermined values and changes rapidly from one value to the other and back again.

The test coil 10 is connected in parallel with a variable capacitor 18 to form a tuned circuit which forms part of a self-biasing oscillator. Thus one end of the tuned circuit is connected to earth whilst the other end is connected hrough a pair of capacitors 19 and 20 in series to earth and through a coupling capacitor 21 to the control grid 23 of a valve 22. The junction of the two capacitors 19 and 20 is connected to the cathode 24 of the valve which is also connected to earth through a variable cathode resistor 25 whilst a grid resistor 26 connects the control grid of the valve to its cathode.

The oscillator is tuned to a frequency intermediate between the two resonant frequencies of the sample, and accordingly during each cycle of the square wave the sample twice passes rapidly through a condition in which its nuclei are in resonance with the test coil.

The present invention is not dependent upon any particular theory of operation, but it is believed that this sets the nuclei in a state of oscillation which persists for a short period. Accordingly during at least the beginning of the ensuing half of the square wave the potential difference across the coil comprises two components, one at the frequency of oscillation, namely that of the tuned circuit, and the other at the resonant frequency of the nuclei. These are equivalent to a component at the sum of the frequencies, namely a very high frequency, and a component at the difference of frequencies, namely at an audio-frequency.

In order to avoid the appearance of two different audio-frequencies the output during one half of the square wave is suppressed. For example in one arrangement a transformer 30 having a centre-tapped secondary winding 31, with the tapping connected to earth, has a primary winding 32 connected to the generator 16 so as to be energised in synchronism with the square wave exciting signal. The ends of the secondary winding are interconnected through two equal arms each comprising a ballast resistor 33 and a diode 34. During one half cycle from the transformer both diodes conduct and due to the equality of the ballast resistors their junction point will be at earth potential. The input and output to the circuit are connected between this point and earth.

This the anode 27 of the valve 22 is connected to the junction of the diodes 34 through a coupling capacitor 35 and a relatively high resistance 36 to increase the generator impedance, so that, in relation to the latter, the arrangement provides virtually a short circuit during alternate half cycles of the square-wave exciting signal.

Thus the output comprises a very high frequency component and an audio-frequency component.

The high-frequency component is eliminated by passing the signal through a tuned audio-frequency amplifier 40, of one or more stages, preferably at least two stages, and additional filtering means if desired, whilst the audio-frequency component is amplified. The output from the amplifier is rectified by a diode 41 and fed to a suitable indicating or recording meter or oscilloscope 42.

The audio-frequency amplifier is tuned to a frequency different from the expected audio-frequency signal so that the amplitude of the output gives a measure of the frequency of the audio-frequency component in the oscillator output. Accordingly the amplitude of the output of the audio-frequency amplifier gives a measure of the difference between the resonant frequency of the sample and the frequency to which the oscillator is tuned.

The arrangement has the advantage that the sample passes very rapidly through the resonant condition and accordingly the resonant condition does not persist long enough for the nuclei to become saturated. Hence no difficulty is experienced even with materials such as some liquids in which the spin-lattice relaxation time may be as much as 300 seconds or more.

Moreover the frequency dispersion of the absorption signal can be recovered from the audio signal produced. For example, if the absorption signal had a band width of 50 c./s. at say 10 mc./s., this same 50 c./s. band width would be present in the audio signal produced. Provided that the audio amplifier has a narrow enough band width (which is also desirable from a noise point of view) then a high resolution can be obtained.

In the arrangement shown in FIGURE 2 the exciting current for modulating the field of the magnet is in the form of a series of short pulses obtained from a thyratron converter, and the high frequency signal is derived from a separate generator at constant frequency. The frequency of the pulses from the thyratron converter is varied cyclically, for example once per second, so as to pass through a value at which the beats produced by one pulse are in phase with and reinforce the beats produced by previous pulses so that the amplitude of the beats builds up cumulatively.

The thyratron converter is of known type comprising a thyratron 50 having its cathode connected to earth through a cathode resistor 51 of a hundred kilohms, and its anode connected to a positive supply 52 through a choke 53 of 1 to 5 millihenrys. The control grid is connected through a resistor 54 of a megohm to the tapping of a half megohm potentiometer 55 connected across the high tension supply. Opposite ends of the cathode resistor 51 are connected in series with a capacitor 56 of .1 microfarad to the exciting coils 15 of the main magnet 12. Such an arrangement, as is known, produces a series of very short pulses of current at a frequency depending upon the potential of the grid of the thyratron. In the present arrangement the grid is also connected through a capacitor 57 of one microfarad to a time base circuit 58 for cyclically varying its potential and hence varying the frequency pulses. This circuit may conveniently be the time base of the cathode ray oscilloscope on which the final results are viewed.

In this case the test coil 10 is connected in a tuned circuit which is provided with positive feed-back by means of a modified Colpitts circuit.

Thus the test coil 10 is connected in parallel with a tuning capacitor 59 of .0005 microfarad and is also shunted by a pair of capacitors 60 and 61 of 47 pf. connected in series with one another. One terminal of the coil is connected to earth whilst the other is connected through a resistor 62 of 5 megohms to a suitable crystal-controlled radio-frequency generator 63. This terminal of the test coil is also connected through a coupling capacitor 64 of 47 pf. to the control grid 66 of a pentode 65 whereof the cathode 67 is connected through a variable resistor 68 of 50 ohms to the junction of the two capacitors 61 and 62 and through a cathode resistor 69 of 820 ohms to earth. The screen 70, which functions as a first anode, is connected to the tapping of a 50K pre-set potentiometer 71 connected across the high tension supply and is also connected to earth through a feed-back capacitor 72 of .001 microfarad. The anode 73 is connected through an anode resistor 74 of 200K to the positive high tension supply, and is also connected to the output through a filtering network comprising parallel capacitors 75 and 76 of .001 microfarad and series resistors 77 and 78 of 470 ohms, and a coupling capacitor 79, to the input of a suitable audio-frequency amplifier 80.

The output of the amplifier is connected to the oscillator or recorder 42 through a phase-sensitive detector 30 to 34 similar to that shown in FIGURE 1. This is supplied from the cathode of the thyratron converter through a suitable amplifier 85 and a squarer 86 so as to give a square wave in synchronism with the pulses from the thyratron converter.

The operation of the arrangement is substantially as follows. At each pulse from the thyratron converter the field strength of the main magnet is rapidly varied from a normal value and then returned to the latter. During the variation it passes through the value at which the resonant frequency of the sample is equal to the frequency of the radio frequency generator, and hence the nuclei are set in a state of resonance. As soon as the field return to its normal value the resonating nuclei and the radio frequency signal have slightly different frequencies and hence produce an audio-frequency beat signal.

If there is no relation between the frequency of the beat signal and the frequency of the pulses, the next beat signal is as likely to cancel out the first as it is to reinforce it, but if the frequency of the pulses is equal to the frequency of the beat signal, the beat signal produced by each pulse will be in phase with that produced by the previous pulse, so that the beat signal will build up cumulatively. As already indicated the frequency of the pulses is varied cyclically so that at a certain point in the cycle it will be equal to the beat frequency and the beat signal will then build up rapidly.

The feed-back in the circuit of the pentode provides greatly increased sensitivity as described in the specification referred to above by greatly increasing the Q of the tuned circuit including the test coil. The sensitivity can be varied by the potentiometer 71 determining the potential of the screen to give a coarse control, and the variable resistor 68 to give a fine control.

The output from the pentode circuit, and from the amplifier 80 following it, is in the form of an alternating signal which builds up as the pulse repetition frequency passes through the beat frequency and then dies away again. The phase-sensitive detector eliminates one half-cycle of this wave and accordingly gives a signal which is in effect the envelope of the audio-frequency alternating signal from the pentode.

The invention is not limited to the particular arrangements described. Thus in a modified arrangement the magnetic field, and hence the frequency of nuclear resonance, is kept constant, whilst the frequency of the tuned circuit and the high frequency signal is periodically altered so as to pass rapidly through the resonant frequency and then remain constant.

What I claim as my invention and desire to secure by Latters Patent is:

1. A nuclear magnetic resonance detector including a test coil for receiving a specimen, means for establishing a magnetic field transverse to the axis of the coil having a field strength to produce a nuclear magnetic precession frequency in the specimen, a tuned circuit including the test coil, means for producing in the said tuned circuit a high frequency signal at a radio-frequency which differs from the precession frequency by an amount approximately in the audio range, means for periodically altering one of said frequencies from a first constant value to a second constant value so as to pass rapidly through a condition of resonance of said specimen and thereafter remain at one of said constant values to thereby produce a signal component at a beat frequency corresponding to the difference between the resonance frequency and the radio-frequency, means for eliminating the radio-frequency signals to provide a resultant frequency signal in accordance with said component, frequency-responsive means, and means for supplying to said frequency-responsive means said beat frequency signal and having an output dependent on the frequency of said resultant frequency signal.

2. A detector as claimed in claim 1 in which the tuned circuit is part of a self-biasing oscillator serving to produce the high-frequency signal.

3. A detector as claimed in claim 1 in which the high-frequency signal is derived from a separate generator whereof the frequency is crystal-controlled.

4. A detector as claimed in claim 1 in which the frequency-responsive means include a tuned audio-frequency amplifier of one or more stages.

5. A detector as claimed in claim 4 in which the amplifier is tuned to a frequency just outside the range of beat frequencies, so that its output amplitude varies with the beat frequency.

6. A detector as claimed in claim 1 in which the nuclear resonance frequency is varied in relation to that of the high-frequency signal in accordance with a square wave, and means is provided for suppressing the audio-frequency beat signal during alternate half cycles of the square wave.

7. A detector as claimed in claim 1 in which the nuclear resonance frequency is varied in relation to that of the high-frequency signal in accordance with a series of short pulses.

8. A detector as claimed in claim 7 in which the pulses are supplied by a thyratron converter.

9. A detector as claimed in claim 8 in which the pulse repetition frequency is modulated at a scanning frequency through a range including the beat frequency or a multiple or sub-multiple thereof, whereby the amplitude of the beat signal is dependent on its frequency, and means responsive to its amplitude is also responsive to its frequency.

10. A detector as claimed in claim 9 in which the beat signal is passed through a phase-sensitive detector synchronised with the pulses to suppress alternate half cycles at the pulse repetition frequency so as to give an envelope of the build-up and die-away of the beat signal during the scanning cycle.

References Cited in the file of this patent

UNITED STATES PATENTS

| 2,772,391 | Mackey | Nov. 27, 1956 |
| 2,894,199 | Kirchner | July 7, 1959 |
| 2,922,947 | Bloom et al. | Jan. 26, 1960 |

OTHER REFERENCES

Pound et al.: The Review of Scientific Instruments, vol. 21, No. 3, March 1950, pp. 219 to 225.

Reif et al.: Physical Review, vol. 91, No. 3, Aug. 1, 1953, pp. 631–641, pp. 631, 640 and 641 principally relied upon.

Wertz: Chemical Reviews, vol. 55, No. 5, November 1955, pp. 837, 838, 890 and 891 relied upon.

Watkins et al.: Physical Review, vol. 85, No. 6, March 15, 1952, page 1062.

Pople et al.: High Resolution Nuclear Magnetic Resonance, pages 40 to 43, McGraw-Hill Book Co., New York, 1959.

Zimmerman et al.: Physical Review, vol. 76, No. 3, Aug. 1, 1949, pp. 350–357.